F. DIEHL.
TIME CONTROLLED MOTOR.
APPLICATION FILED JULY 26, 1916. RENEWED AUG. 5, 1920.
1,411,712.
Patented Apr. 4, 1922.
4 SHEETS—SHEET 1.
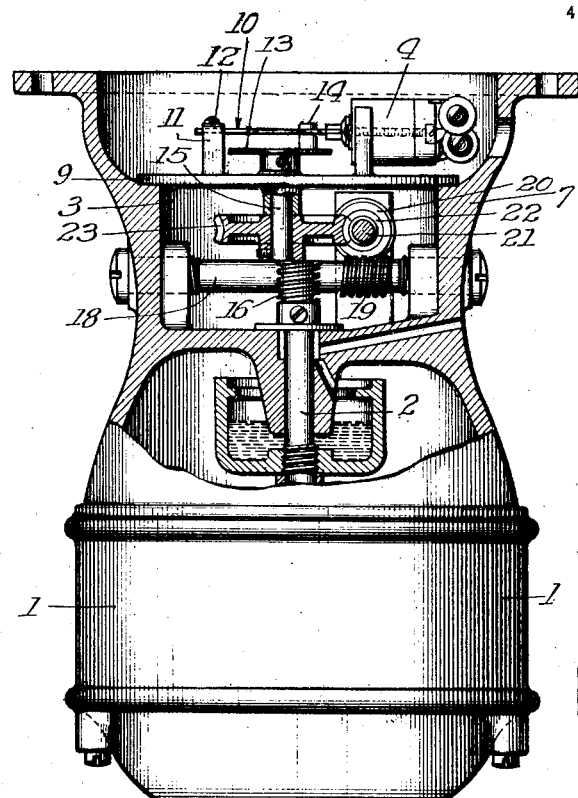
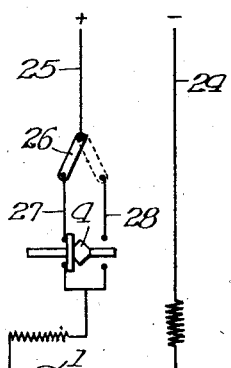
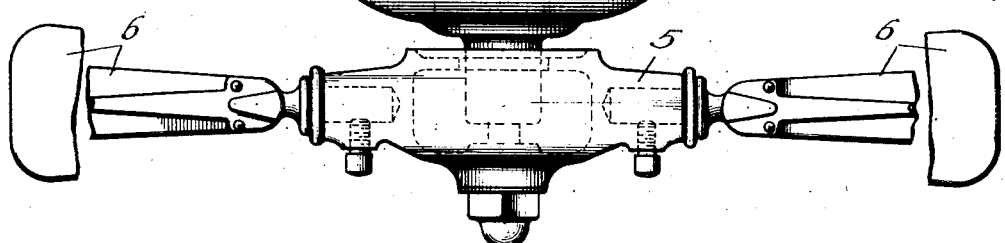
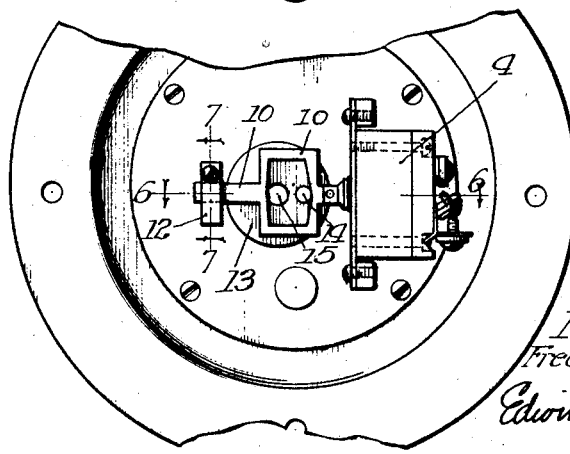
Inventor
Frederick Diehl
Edwin B. H. Tower Jr.
Atty.

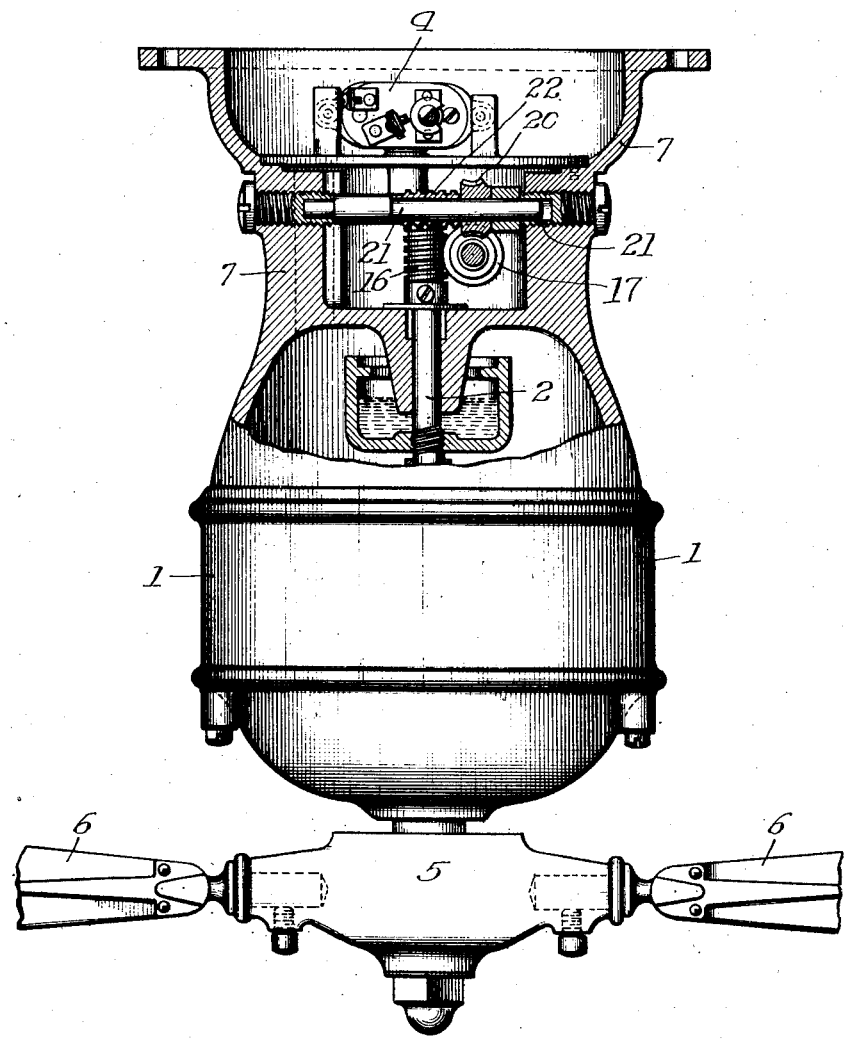

F. DIEHL.
TIME CONTROLLED MOTOR.
APPLICATION FILED JULY 26, 1916. RENEWED AUG. 5, 1920.

Patented Apr. 4, 1922.

Inventor
Frederick Diehl
Edwin B. H. Tower Jr. Atty.

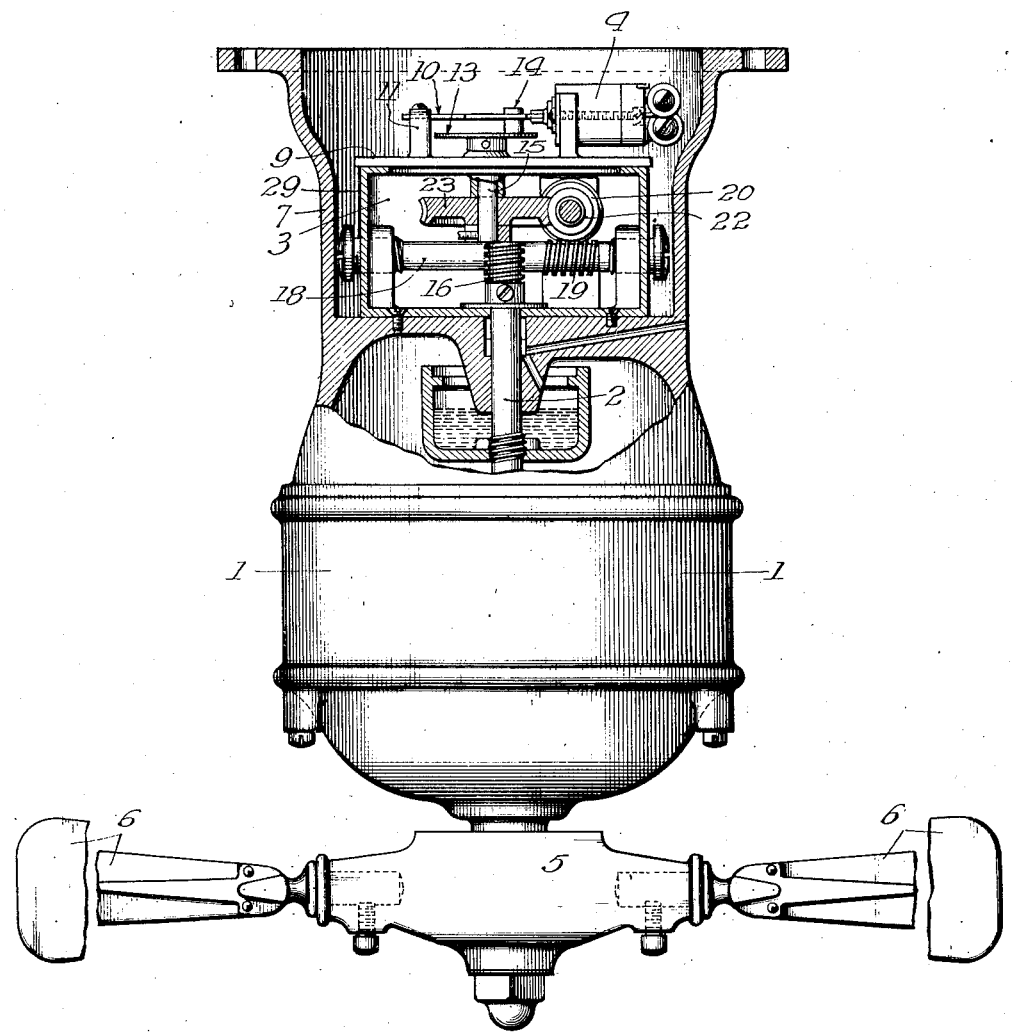

UNITED STATES PATENT OFFICE.

FREDERICK DIEHL, OF ELIZABETH, NEW JERSEY, ASSIGNOR TO DIEHL MANUFACTURING CO., OF ELIZABETH, NEW JERSEY, A CORPORATION OF NEW JERSEY.

TIME-CONTROLLED MOTOR.

1,411,712.   Specification of Letters Patent.   Patented Apr. 4, 1922.

Application filed July 26, 1916, Serial No. 111,485. Renewed August 5, 1920. Serial No. 401,560.

*To all whom it may concern:*

Be it known that I, FREDERICK DIEHL, a citizen of the United States, residing at Elizabeth, in the county of Union and State of New Jersey, have invented new and useful Improvements in Time-Controlled Motors, of which the following is a specification.

The invention relates to time controlled motors.

It is particularly applicable to electric motors for operating fans and the like, although not limited to such use.

Frequently a motor is allowed to run for a period longer than it is needed because the operator fails to stop it. It is important that some means be provided for preventing the consequent waste of power under such conditions. It is desirable that this means be compact and that it be housed within the motor casing to render the time controlled motor rugged and serviceable for such uses as operating fans, etc.

One of the objects of the invention is to provide a motor whose casing houses means for automatically stopping the motor after it has run for a certain period.

Another object is to provide an improved controller for motors.

Another object is to provide means for shutting off the power to a motor, after it has operated for a certain period, which means forms a unit readily removable from the motor casing.

Another object is to provide a time controlled electric fan which is rugged in construction and neat in appearance.

Other objects and advantages of the invention will hereinafter appear.

The accompanying drawings illustrate embodiments of the invention.

The views of the drawing are as follows:

Figure 1 is a side elevation and partial cross section of an electric motor.

Figure 2 is a plan of Figure 1.

Figure 3 is a diagram of the electrical connection to the motor.

Figure 4 is a side elevation and partial cross section taken at right angles to the view of Figure 1.

Figure 8 is a side elevation and partial cross section of a modified form in which the mechanism is mounted in the fan base as a unit.

Figure 5:
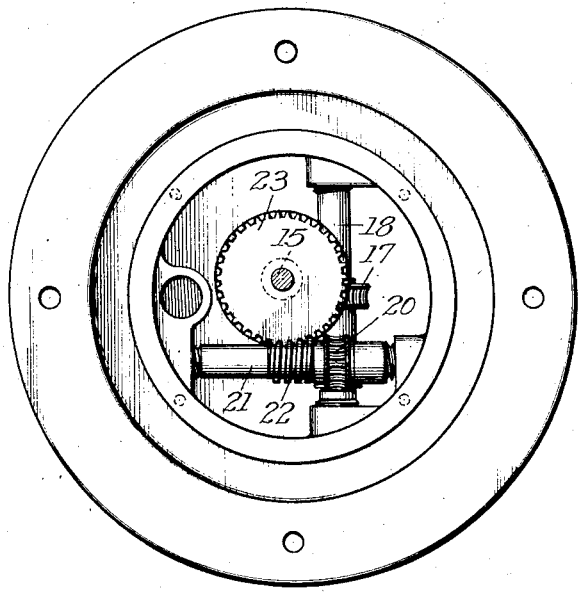
Figure 5 is a plan of Figure 1 with the cover on which the switch is mounted removed.

The embodiment illustrated in Figure 1 comprises an electric motor 1, the armature shaft 2 of which drives a reduction gearing 3 which actuates the switch 4 to open the power circuit to the motor.

The electric motor may be of any suitable type. The motor illustrated is particularly adapted to drive a ceiling fan. The lower end of the armature shaft carries a hub 5 having fan blades 6 attached thereto. The base 7 of the motor is provided with suitable openings to receive fastening means for attaching the base to a ceiling. The base is made hollow to receive the reduction gearing 3 and the switch 4.

The switch 4 is a snap switch of any suitable type. The type illustrated is known as the hill-and-valley or garter-spring switch. The actuating shaft 8 of this switch reciprocates back and forth and when it passes a certain point causes the contact member of the switch to be thrown from one position to the other with a snap action. This switch is well known and it is not considered necessary to further describe the same herein. It is mounted upon a plate 9 which forms a cover for the recess containing the gearing 3.

Figure 6:
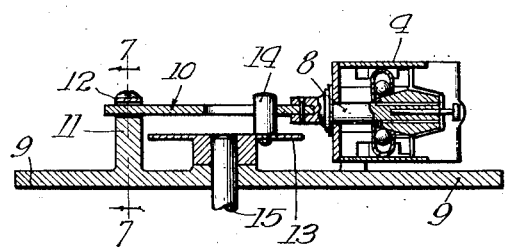
Figure 6 is a cross section of the switch mechanism and the actuating means therefor.
Figure 7:
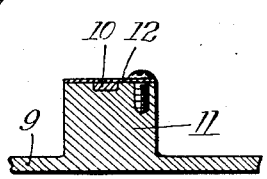
Figure 7 is a cross section on the line 7—7 of Figure 6.

The switch shaft 8 has connected thereto a cam 10 of rectangular outline as illustrated in Figure 2. This cam is rigidly attached to shaft 8 at one end and its other end has an extension which is slidably mounted in a bearing 11 carried by the cover 9 upon which the switch 4 is mounted. The connection of the cam 10 to the shaft 8 and the construction of the bearing 11 are clearly shown in Figures 6 and 7. The extension on cam 10 preferably slides in a recess in the bearing 11 and is held in position by a removable plate 12.

The cam 10 is actuated by a rotatable disk 13 having a pin 14 which engages the inner surfaces of the cam 10. The disk 13 is mounted on the shaft 15 which is rotated by the armature shaft at a greatly reduced speed by means of the reduction gearing 3.

The reduction gearing which has been designated generally by the reference numeral 3 includes a worm 16 attached to the armature shaft 2, said worm meshing with a worm wheel 17 carried by shaft 18 journaled in the suitable bosses on the motor base 7. The shaft 18 carries a second worm 19 which meshes with the worm 20 carried by shaft 21 which is journaled in the base 7 of the motor at right angles to shaft 18. The shaft 21 carries a worm 22 which meshes with a worm gear 23 attached to the shaft 15 which drives the disk 13.

By means of this train of worm gears the disk 13 is driven by the armature 2 at a greatly reduced speed. For example, in the motor illustrated, the disk 13 revolves through only a half revolution in thirty minutes when the motor is running at normal speed. Of course, the gears may be arranged so as to rotate the disk at other speeds to operate the switch at periods of any desired length.

The electric circuits for the motor are shown diagrammatically in Figure 3. One side of the power supply line is connected to the motor by conductor 24 and the other side is connected by conductor 25 through a manually operated switch 26 to one of two parallel conductors 27 and 28 to the other side of the motor. The switch 4 opens and closes the circuits through the conductors 27 and 28 as illustrated. When switches 4 and 26 are in the full line position shown, the motor receives power through the conductor 25, switch 26, conductor 27 and switch 4 and accordingly rotates until the switch 4 is automatically snapped to its opposite position whereupon the circuit of the motor through conductor 27 is opened and the circuit through conductor 28 is closed. The power circuit to the motor is thus opened since the switch 26 is in engagement with the conductor 27 whose circuit has been opened by switch 4. In order to start the motor it is necessary to move the switch 26 to its dotted line position so that current may flow through conductor 28 and switch 4 to the motor.

The operation of the apparatus is as follows:

The motor is started by moving the switch 26 to complete a circuit through either the conductor 27 or the conductor 28 whichever happens to be closed by the switch 4. The rotation of the motor armature shaft actuates the reduction gearing 3 which gradually rotates the disk 13. After the motor has operated for a certain period, for example, thirty minutes, the disk 13 will have been rotated half a revolution and pin 14 will have moved from one end of the cam to the other. During this movement it will have moved the cam to actuate switch shaft 8 so that at the end of the thirty minutes the contacts of switch 4 will snap to their opposite position and open the circuit of the motor. The motor will thereupon cease to run. If it is desired to have the operation of the motor continue, it is necessary to move the switch 26 to its opposite position, which movement will again energize the circuit of the motor.

The modification illustrated in Figure 8 corresponds for the most part to that hereinbefore described. The reduction gearing, the snap switch and the actuating disk are the same, but said parts instead of being mounted directly in the base of the motor are mounted within a box 29, which in turn is mounted in a recess in the base of the motor. The entire mechanism may thus be removed as a unit for inspection or repair.

It will thus be seen that a compact, simple and inexpensive mechanism has been provided which will automatically stop the motor after it has run for a certain period. The mechanism is entirely mounted within the base of the motor and does not detract in any way from the appearance thereof. It is positive in operation without requiring an excessive amount of power to actuate it. It automatically prevents the motor being allowed to be run for extended periods while the operator is absent, and when the motor is not needed.

It is to be understood that the structure shown is for purposes of illustration only, and that other structures may be devised which come within the spirit and scope of the appended claims.

What I claim and desire to secure by United States Letters Patent is:—

1. An electric motor and power controlling device formed as a unitary structure, comprising a casing housing the motor and forming a part thereof in which the motor shaft is journaled, means housed within the casing for controlling the power supplied to the motor, and means operated from the motor and also housed within the casing for automatically actuating the controlling means after the motor has operated for a certain period.

2. An electric motor having a snap switch mounted in the base thereof, a reciprocating cam attached to the switch shaft, a rotatable disk carrying a pin cooperating with said cam and reduction gearing connected to said rotatable shaft and actuated by the motor armature for operating the switch to shut off the power after the motor has run for a certain period.

3. In combination with a motor having a casing forming a portion of the motor, means housed within the casing for controlling the power supplied to the motor, and means operated from the motor and also housed within the casing for automatically actuating said controlling means to shut off the power after the motor has run for a certain period.

4. An electric motor having a snap switch mounted in the base thereof, a reciprocating member attached to the switch shaft, and means comprising reduction gearing actuated by the motor armature for operating said reciprocating member to shut off the power after the motor has run for a certain period.

5. An electric motor having a casing forming therewith a compact unitary structure in which the motor shaft is journaled, a switch housed within the motor casing, a reciprocating member operatively connected to the switch, and means comprising reduction gearing and a cam actuated by the motor armature for causing the reciprocating member to operate the switch to shut off the power after the motor has run for a certain period.

6. In an electric fan, the combination of a motor casing forming a support for the fan, a motor housed within the casing with the motor shaft journaled therein, means within the motor casing for controlling the power supply to the fan motor, and means operated from the motor armature and also housed within the motor casing for automatically actuating said controlling means to shut off the power after the fan has run for a certain period.

7. The combination of a motor and a casing therefor forming a part of the motor and in which the motor shaft is journaled, of means housed within the motor casing for controlling the power supply to the motor, and means also housed within the motor casing for actuating said controlling means to shut off the power after the motor has run for a certain period, both of said means being removable as a unit from said motor casing.

8. In a time controlled motor having a casing therefor, forming a part thereof and in which the motor shaft is journaled, the combination of a controller for the power supplied to the motor, and an actuator for the controller adapted to be operated by the motor when both controller and actuator are mounted in the casing and actuate the controller after the motor has operated for a certain period.

9. In a time controlled motor having a casing therefor, forming a part thereof and in which the motor shaft is journaled, the combination of a controller for the power supplied to the motor, and an actuator for the controller adapted to be operated by the motor when both controller and actuator are mounted in the casing and actuate the controller after the motor has operated for a certain period, the controller and actuator forming a unit removable from the casing.

10. In a time controlled electric motor having a casing therefor, forming a part thereof and in which the motor shaft is journaled, the combination of a switch, a reciprocating member operatively connected therewith, and means including reduction gearing adapted when mounted in the motor casing to be actuated by the motor armature for operating the reciprocating member to shut off the power after the motor has run for a certain period.

In witness whereof, I have hereunto subscribed my name in the presence of two witnesses.

FREDERICK DIEHL.

Witnesses:
C. H. MORRELL,
H. L. ZATVISKIE.